(No Model.)
L. BARBIER.
MANUFACTURE OF GLUCOSE.
No. 299,900. Patented June 3, 1884.
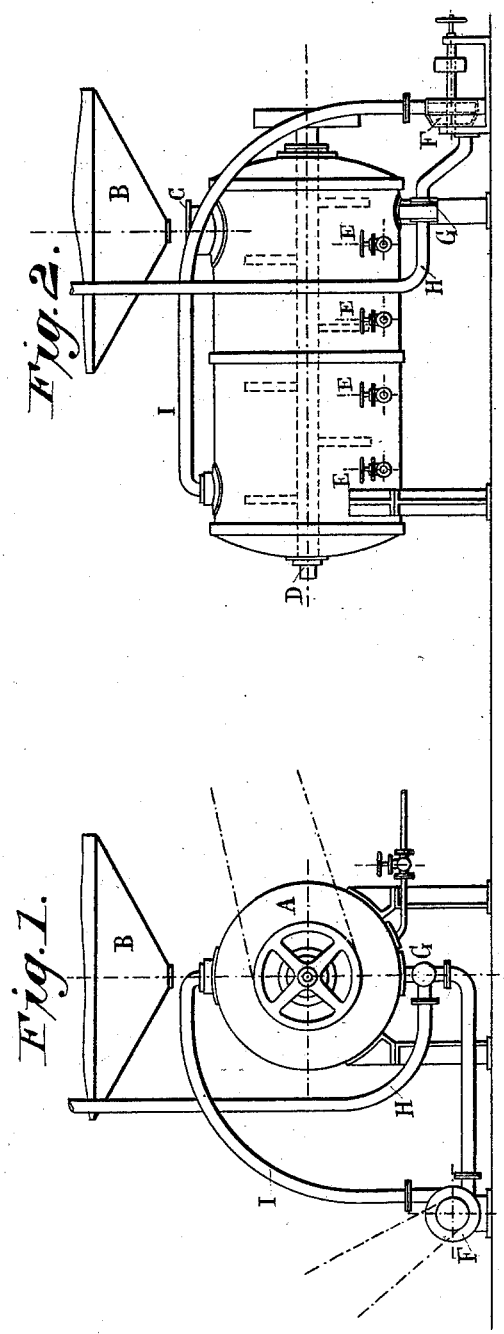
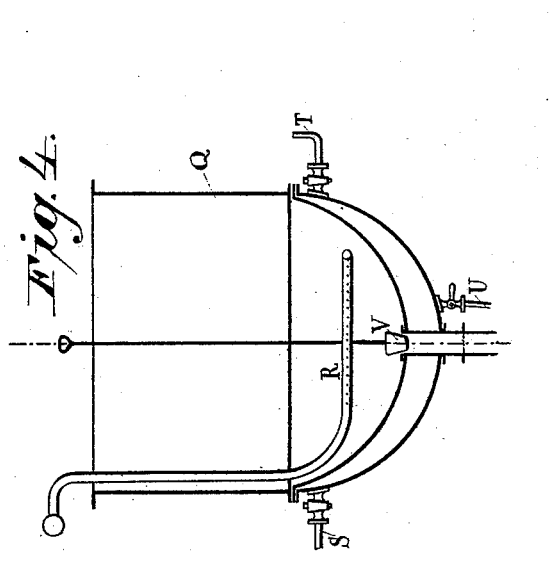
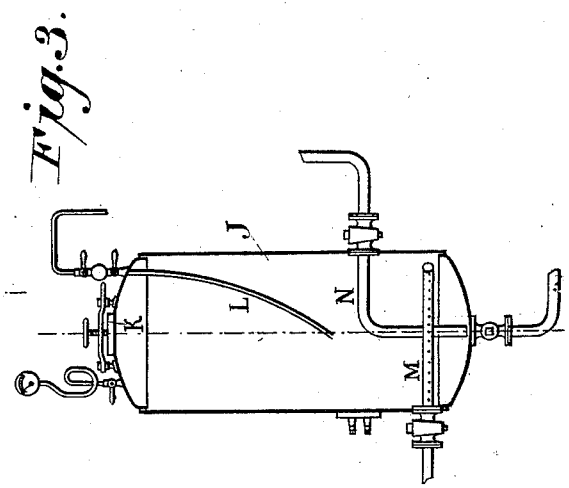
Witnesses
Inventor
Leon Barbier
by A. Pollok
his attorney

UNITED STATES PATENT OFFICE.

LÉON BARBIER, OF BESANÇON, FRANCE.

MANUFACTURE OF GLUCOSE.

SPECIFICATION forming part of Letters Patent No. 299,900, dated June 3, 1884.

Application filed February 11, 1884. (No model.)

*To all whom it may concern:*

Be it known that I, LÉON BARBIER, of Besançon, in the Republic of France, have invented a new and useful Improvement in the Manufacture of Glucose, which is fully set forth in the following specification.

This invention has reference to a new and simplified method or process of making glucose-sirups. It consists in separating the albuminous and nitrogenous matters from the sirup, which is obtained by the direct saccharification of the vegetable materials, and specially of grains, and in effecting this separation by the methods employed in the manufacture of crystallizable or cane sugar—that is to say, by the operation known as "defecation" or by "double carbonatation." The new process comprises the following steps: first, division of the grain or other vegetable material, preferably by cooking, crushing, and dilution with water; second, saccharification of the divided and diluted material with acids or diastase; third, defecation by the process of double carbonatation or analogous process. For the decoloration and concentration of the sirup, the methods and means may be employed which have heretofore been used for the same purposes in treating the sirup of glucose obtained by acting upon starch. The operations required to separate the starch from the amylaceous substances—to wit, grinding or crushing, washing, straining through a sieve, drying, stoving, and the like—are dispensed with in this new process. The manufacture is therefore simpler, surer, and gives a larger yield.

The accompanying drawings represent apparatus which is or may be used in carrying the process into effect.

Figure 1 is an end view of the cooking and disintegrating apparatus; Fig. 2, a side view of the same; Fig. 3, a central vertical section of the apparatus for saccharification, and Fig. 4 a central vertical section of the defecating or carbonating apparatus.

The cooking and disintegrating apparatus resembles those employed in certain alcohol-works.

A is the cooking-vessel for containing the material to be cooked and reduced. It is of cylindrical form, and is raised upon feet or standards, as shown. A horizontal shaft, D, is journaled in the heads of the vessel A, and extends centrally through it. On one end of the shaft is a pulley for revolving it. Said shaft, inside the vessel A, is provided with arms, as shown in dotted lines, Fig. 2, for stirring and beating the material to be placed therein.

At C is the opening for filling the vessel. It is provided with a cover for closing it when desired. Above it is a hopper, B, for facilitating the introduction of the grain or other vegetable material into the cooking-vessel. At the bottom of said vessel are a series of steam-pipes, E, each provided with a regulating-cock, and each terminating in a rose or perforated section of pipe inside the cooking-vessel. A comparatively large pipe, G, connects the bottom of the vessel A with the inlet of a small centrifugal pump, F. The outlet of the pump communicates with the top of the vessel A by the pipe I. The centrifugal pump F is so constructed that the material is drawn through an annular space of conical form between the case and the revolving part inside. This inside part is combined with a set-screw for adjusting it nearer to or farther from the case, so as to diminish or increase the depth of said space. The pump acts the part of a crusher of the grain or other vegetable material placed in the vessel A, as well as that of a circulator of the grain and water. The adjustment of the inner revolving part of the pump determines the degree to which the grain is to be reduced.

In operation the vessel A is filled about two-thirds full of water. Then the grain or other material is introduced. The shaft D is revolved, steam is injected by the pipes E, and a circulation is maintained through the pipe G, pump F, and pipe I. When the cooking and reduction have been carried far enough, the communication with the pump F is cut off, and communication is opened with the pipe H. For this purpose a three-way cock is provided in the pipe G at its junction with the pipe H. The mixture or thin paste is forced through the pipe H into the saccharifying apparatus. This apparatus is shown in Fig. 3. It comprises an upright cylindrical vessel, J, a steam-pipe, M, terminating in a perforated section or rose, a testing-pipe, L, a discharge-pipe, N, a draw-off pipe, a filling-hole, K, provided with a cover, and a pressure-gage. The thin paste or batter from the cooking apparatus is introduced through the hole K, the acid or diastase is added through the same hole, and the latter is then closed by its cover. Steam introduced through the pipe M heats and agitates the mixture. Samples are taken off from time to time by the pipe L to ascertain the progress of the saccharification. When the conversion is complete, the contents of the vessel J are discharged by the pressure of the steam into a receptacle. The acid is then neutralized with lime and the mass is filtered. The residues which are retained by the filters are or may be treated with sulphide of carbon to extract the oil therefrom. The filtrate is introduced into the defecating apparatus, Fig. 4. This is an open kettle, Q, having its bottom jacketed, and provided with an injecting-pipe, R, terminating in a perforated section or rose, and a discharge-pipe, V. Steam is admitted into the jacket by the pipe S. It escapes by the pipe T. The condensed water is drawn off by the pipe U. The sirup, or "filtrate" as it is called above, having been introduced into the kettle, it is heated by the steam-jacket, and carbonic-acid gas is forced through the pipe R. This gas passing through the sirup keeps it in active agitation. The current is continued until defecation or carbonatation is complete. The sirup is drawn off by raising the plug at the top of pipe V. It is run into a settling-vat. The upper part is decanted in the usual way. The turbid or muddy part which remains at the bottom is passed through the filters. The whole is then decolorized by filtration through animal-black, and is concentrated in evaporating-pans.

The process described is applicable to all vegetable matters as well as to amylaceous substances, and even to sugar-containing materials, it being understood, however, that the sugar is inverted and rendered uncrystallizable.

Having now fully described my said invention and the manner of carrying the same into effect, what I claim is—

In the manufacture of glucose-sirups, the improvement consisting in applying the processes of defecation used in sugar-works—such as the process of carbonatation or treatment with carbonic acid—to the impure sirups obtained by the saccharification direct and under pressure of the amylaceous or other materials previously cooked, disintegrated, and diluted, the whole being substantially as hereinbefore set forth.

In testimony whereof I have signed this specification in the presence of two subscribing witnesses.

LÉON BARBIER.

Witnesses:
ERNEST DUPONT,
JEAN ROBELET.